United States Patent [19]

Maeda et al.

[11] Patent Number: 5,238,081

[45] Date of Patent: Aug. 24, 1993

[54] DRIVING WHEEL SLIP CONTROL DEVICE FOR VEHICLE

[75] Inventors: Shoji Maeda; Hideaki Arai, both of Wako, Japan

[73] Assignee: Honda Giken Kogyo Kabushiki Kaishi, Tokyo, Japan

[21] Appl. No.: 942,053

[22] Filed: Sep. 4, 1992

Related U.S. Application Data

[63] Continuation of Ser. No. 741,206, Jul. 30, 1991, abandoned, which is a continuation of Ser. No. 438,145, Nov. 20, 1989, abandoned.

[30] Foreign Application Priority Data

Nov. 24, 1988 [JP] Japan ................................ 63-276856

[51] Int. Cl.$^5$ .............................................. B60K 28/16
[52] U.S. Cl. ..................... 180/197; 364/426.02; 364/426.03
[58] Field of Search ................... 180/197; 364/426.02, 364/426.03, 426.04

[56] References Cited

U.S. PATENT DOCUMENTS

| | | | |
|---|---|---|---|
| 4,615,410 | 10/1986 | Hosaka | 364/426.03 |
| 4,721,176 | 1/1988 | Kabasin et al. | 180/197 |
| 4,771,848 | 9/1988 | Namba et al. | 180/197 |
| 4,850,446 | 7/1989 | Leiber et al. | 364/426.03 |
| 4,921,064 | 5/1990 | Wazaki et al. | 180/197 |
| 4,933,857 | 6/1990 | Hasiguchi et al. | 180/197 |

Primary Examiner—Mitchell J. Hill
Attorney, Agent, or Firm—Armstrong, Westerman, Hattori, McLeland & Naughton

[57] ABSTRACT

A driving wheel slip device for a vehicle includes a slip detector for detecting a slip condition of a driving wheel, a fuel supply controller for controlling a fuel supply quantity to an engine of the vehicle, in response to an output from the slip detector, and an ignition timing changing circuit for advancing ignition timing of the engine from a standard ignition timing under a normal fuel supply control to an advanced ignition timing, in synchronization with fuel supply reduction control, including fuel supply cut, carried out by said fuel supply controller.

6 Claims, 6 Drawing Sheets

DRIVING WHEEL SLIP CONTROL DEVICE FOR VEHICLE

This application is a continuation of application Ser. No. 07/741,209 filed Jul. 30, 1991, abandoned which in turn is a continuation of application Ser. 07/438,145 filed on Nov. 20, 1989 abandoned.

BACKGROUND OF THE INVENTION

The present invention relates to a driving wheel slip control device for a vehicle.

A so-called traction control system is known from Japanese Patent Laid-open Publication No. 60-143171, for example. In the traction control system, when excess slip is generated in a driving wheel, fuel supply is cut off to reduce an engine output and thereby eliminate the excess slip.

However, such fuel supply reduction (including a reduction of the fuel supply) with respect to the engine is carried out when the driving wheel is in a slip condition, that is, when the engine is in a high load condition. Under such a condition of the engine, a fuel component in a combustion chamber of the engine is reduced because of the fuel supply reduction, causing an increase in resistance (or insulation resistance) at an ignition plug gap. The insulation resistance is increased with an increase in pressure in the combustion chamber. Therefore, the higher the engine load, the more the insulation resistance. Further, the insulation resistance becomes high when the ignition timing is near top dead center in a compression stroke. Accordingly, if a spark is emitted at the plug gap under the condition where the insulation resistance is high, as mentioned above, a demanded voltage (dielectric breakdown voltage) at the plug gap is rendered as high as 30 KV or more. As a result, there is a possibility of dielectric breakdown being generated at other portions besides the plug gap, such as between a high-tension cord-plug connecting portion and an engine block or in an ignition coil.

SUMMARY OF THE INVENTION

It is accordingly an object of the present invention to provide a driving wheel slip control device for a vehicle which can prevent the generation of dielectric breakdown at other portions besides the plug gap in reducing a fuel supply quantity in order to eliminate a slip condition of the driving wheel.

According to the invention, the driving wheel slip control device is provided with ignition timing changing means for advancing the ignition timing of an engine from standard ignition timing under normal fuel supply control, in synchronization with fuel reduction control (including reduction of the fuel supply) conducted by fuel supply control means. Thus, ignition can be conducted under relatively low pressure in the combustion chamber of the engine by advancing the ignition timing. Therefore, when the fuel supply is in reduction control inclusive of reduction of the fuel supply, ignition is carried out under a relatively low pressure in the combustion chamber by advancing the ignition timing. Accordingly, the demanded voltage at the plug gap can be suppressed to a relatively low value, thereby preventing the generation of dielectric breakdown at any portions other than the plug gap.

Further, according to the invention, the driving wheel slip control device is provided with current supply time shortening means for shortening a period of time of current supply to an ignition coil of the engine in synchronization with fuel supply reduction control (including reduction of the fuel supply) conducted by fuel supply control means. Accordingly, spark energy of the ignition plug can be suppressed to a relatively low value by delaying the current supply start timing. Therefore, when the fuel supply is in reduction control inclusive of reduction of the fuel supply, a spark energy of the ignition plug ca be suppressed to a relatively low value by shortening a current supply time. Thus, the generation of dielectric breakdown at any portions other than the plug gap can be prevented.

Also, according to the invention, the driving wheel slip control device is provided with current supply inhibiting means for inhibiting current supply to an ignition coil of an engine in synchronization with fuel supply reduction control (including fuel reduction of the fuel supply) conducted by fuel supply control means. Therefore, the current supply and spark energy to the ignition plug is suppressed. Thus, when the fuel supply is in reduction control inclusive of reduction of the fuel supply, and the current supply to the ignition plug is suppressed, the generation of dielectric breakdown at any portions other than the plug gap is thereby prevented.

BRIEF DESCRIPTION OF THE DRAWINGS

The advantages of the invention will become apparent in the following description taken in conjunction with the drawings described below, wherein.

DETAILED DESCRIPTION OF THE PREFERRED EMBODIMENTS

The invention will be described below with reference to the drawings and as applied to a front-wheel drive vehicle. Of course it may also apply to vehicles with other drive train configurations.

Figure 1:
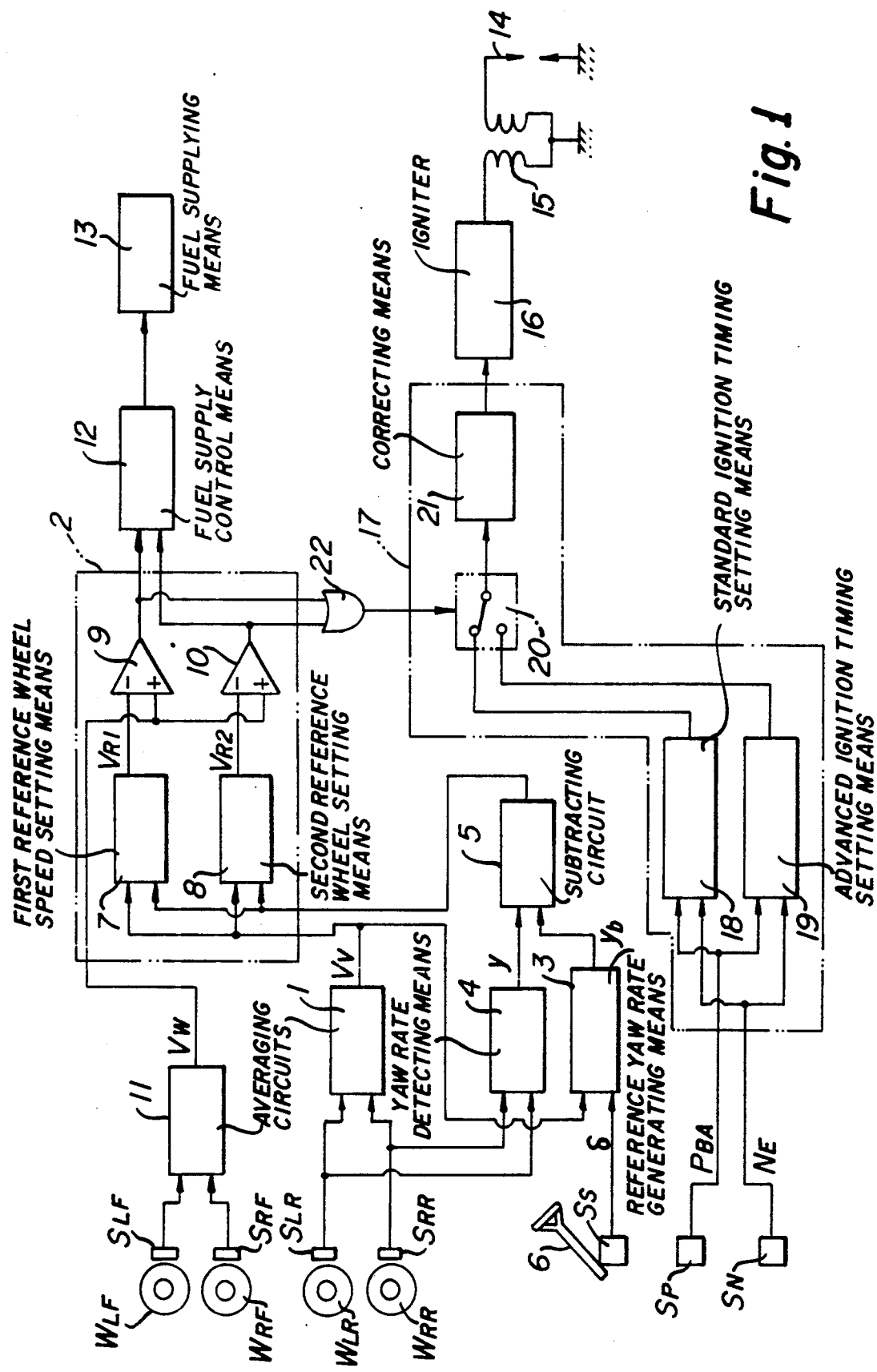
FIG. 1 is a block diagram of a first embodiment of the present invention.

Referring first to FIG. 1 which shows a first embodiment of the present invention, rear wheels $W_{LR}$ and $W_{RR}$ as driven wheels are provided with speed sensors $S_{LR}$ and $S_{RR}$, respectively. Driven wheel speeds obtained by the speed sensors $S_{LR}$ and $S_{RR}$ are input to an averaging circuit 1, and are averaged by the averaging circuit 1 to obtain a vehicle speed $V_V$. The vehicle speed $V_V$ is input to a slip detecting means 2 and a reference yaw rate generating means 3.

The driven wheel speeds obtained by the speed sensors $S_{LR}$ and $S_{RR}$ are also input to a yaw rate detecting means 4. The yaw rate detecting means 4 functions to detect a yaw rate y of the vehicle according to a difference between both of the driven wheel speeds. The yaw rate y obtained by the yaw rate detecting means 4 is input to a subtracting circuit 5. On the other hand, a steering wheel 6 of the vehicle is provided with a steering angle sensor $S_S$, and a steering angle $\delta$ obtained by the steering angle sensor $S_S$ is input to the reference yaw rate generating means 3. Thus, the reference yaw rate generating means 3 functions to set a reference yaw rate $y_b$ (an intended yaw rate) as a function of the vehicle speed $V_V$ and the steering angle $\delta$. The reference yaw rate $y_b$ is input to the subtracting circuit 5.

The subtracting circuit 5 functions to obtain a difference between the reference yaw rate $y_b$ and the yaw rate y, that is, a slippage between the reference yaw rate $y_b$ and the actual yaw rate y. An output from the subtracting circuit 5 is input to the slip detecting means 2.

The slip detecting means 2 includes a first reference wheel speed setting means 7, a second reference wheel speed setting means 8, a first comparator circuit 9 and a second comparator circuit 10. The first and second reference wheel speed setting means 7 and 8 function to correct a reference wheel speed to be obtained according to the vehicle speed $V_v$ obtained by the averaging circuit 1, according to the output from the subtracting circuit 5, that is, the slippage between the yaw rates $y_b$ and y, and set first and second reference wheel speeds $V_{R1}$ and $V_{R2}$, respectively. The first reference wheel speed $V_{R1}$ is set according to a permissible slip rate, and the second reference wheel speed $V_{R2}$ is set to be larger than the first reference wheel speed $V_{R1}$, assuming a condition where excess slip is generated.

Front wheels $W_{LF}$ and $W_{RF}$ as driving wheels are provided with speed sensors $S_{LF}$ and $S_{RF}$, respectively, and driving wheel speeds obtained by the speed sensors $S_{LF}$ and $S_{RF}$ are input to an averaging circuit 11 to obtain a driving wheel speed $V_W$. The driving wheel speed $V_W$ is input to non-inverting input terminals of the first and second comparator circuits 9 and 10. The first reference wheel speed $V_{R1}$ obtained by the first reference wheel speed setting means 7 is input to an inverting input terminal of the first comparator circuit 9, and the second reference wheel speed $V_{R2}$ obtained by the second reference wheel speed setting means 8 is input to an inverting input terminal of the second comparator circuit 10.

Outputs from the slip detecting means 2, that is, outputs from the first and second comparator circuits 9 and 10 are input to a fuel supply control means 12. The fuel supply control means 12 functions to control the operation of a fuel supplying device 13 according to the outputs from the slip detecting means 2. More specifically, when both the outputs from the first and second comparator circuits 9 and 10 have a low level, the fuel supply control means 12 determines that no slip is generated in the front wheels $W_{LF}$ and $W_{RF}$ and normally operates the fuel supplying device 13. When the output from the first comparator circuit 10 has a low level, the fuel supply control means 12 determines that slip is ready to be generated in the front wheels $W_{LF}$ and $W_{RF}$ and normally operates the fuel supplying device 13. When the output from the first comparator circuit 9 has a high level, and the output from the second comparator circuit 10 has a low level, the fuel supply control means 12 determines that slip is ready to be generated in the front wheels $W_{LF}$ and $W_{RF}$ and reduces the fuel supply quantity of the fuel supplying device 13. Further, when both the outputs from the first and second comparator circuits 9 and 10 have a high level, the fuel supply control means 12 determines that excess slip is generated in the front wheels $W_{LF}$ and $W_{RF}$ and makes the fuel supplying device 13 inoperative, that is, cuts off fuel supply the air/fuel ratio becomes infinite from the fuel supplying device 13.

An ignition plug 14 is connected with an ignition coil 15 which is excited by an igniter 16. The operation of the igniter 16 is controlled by an ignition timing changing means 17. The ignition timing changing means 17 is so constructed as to advance the ignition timing of the engine from an ignition timing in normal fuel supply condition, in synchronization with fuel supply reduction control (including fuel reduction of the fuel supply) conducted by the fuel supply control means 12.

More specifically, the ignition timing changing means 17 includes standard and advanced ignition timing setting means 18 and 19 for presetting ignition timings according to an absolute intake manifold pressure $P_{BA}$ to be detected by an intake manifold pressure sensor $S_P$ and an engine speed $N_E$ to be detected by an engine speed sensor $S_N$, a switching means 20 for changing a switching mode according to the outputs from the slip detecting means 2, and a correcting means 21 for correcting an output from the switching means 20 and inputting a corrected signal to the igniter 16.

The standard ignition timing setting means 18 has a map setting a standard ignition timing in the normal fuel supply condition according to the absolute intake manifold pressure $P_{BA}$ and the engine speed $N_E$, while the advanced ignition timing setting means 19 has a map setting an advanced ignition timing upon fuel supply reduction inclusive of fuel supply cut according to the absolute intake manifold pressure $P_{BA}$ and the engine speed ignition timing set by the advanced ignition timing setting means 19 is advanced from the ignition timing set by the standard ignition timing setting means 18. The switching means 20 functions to select the connection of the standard ignition timing setting means 18 or the advanced ignition timing setting means 19 to the correcting means 21. When the output from OR circuit 22 becomes high, the switching means 21 operates to change from the switching mode in which the standard ignition timing setting means 19 is connected to the correcting means 21. The first and second comparator circuits 9 and 10 in the slip detecting means 2 are connected to two input terminals of OR circuit 22. Accordingly, when it is determined that slip is about to be generated in the front wheels $W_{LF}$ and $W_{RF}$ or when it is determined that excess slip has already been generated in the front wheels $W_{LF}$ and $W_{RF}$, signals indicative of fuel supply reduction or reduction of the fuel supply are input from the slip detecting means 2 to the fuel supply control means 12. At the same time, the switching means 20 receives a high-level output from OR circuit 22 to change the switching mode from the standard ignition timing setting means 18 to the advanced ignition timing setting means 19. The correcting means 21 functions to variously correct the ignition timing set by the standard ignition timing setting means 18 or the advanced ignition timing setting means 19.

In operation, when no slip is generated in the front wheels $W_{LF}$ and $W_{RF}$, the ignition plug 14 is ignited at the ignition timing set by the standard ignition timing setting means 18. When slip is about to be generated in the front wheels $W_{LF}$ and $W_{RF}$, the quantity of fuel supplied to the cylinders is reduced to avoid the generation of the slip, and furthermore, when excess slip has already been generated, the supply of fuel to the cylinders is cut off in order to suppress the driving force of the front wheels $W_{LF}$ and $W_{RF}$ and to thereby eliminate the excess wheel slip. Further, in the fuel supply reduction control (including reduction of the fuel supply), the ignition plug 14 is ignited at the ignition timing set by the advanced ignition timing setting means 19. The ignition timing set by advanced ignition timing setting means 19 is advanced in comparison with the ignition timing set by the standard ignition timing setting means 18. Accordingly, although the resistance at the gap of the ignition plug 14 becomes high because of a reduction in fuel component in the combustion chamber which is caused by the fuel supply reduction inclusive of reduction of the fuel supply, the ignition of the ignition plug 14 is started under a relatively low pressure in the combustion chamber in order to avoid the possibility that a demanded voltage at the gap of the ignition plug 14 the spark energy of the ignition plug will become as high as 30 KV or more. Accordingly, it is possible to prevent dielectric breakdown from occurring at any portion other than the gap of the ignition plug 14 such as between a high-tension cord-plug connecting portion and the engine block or in the ignition coil 15.

Figure 2:
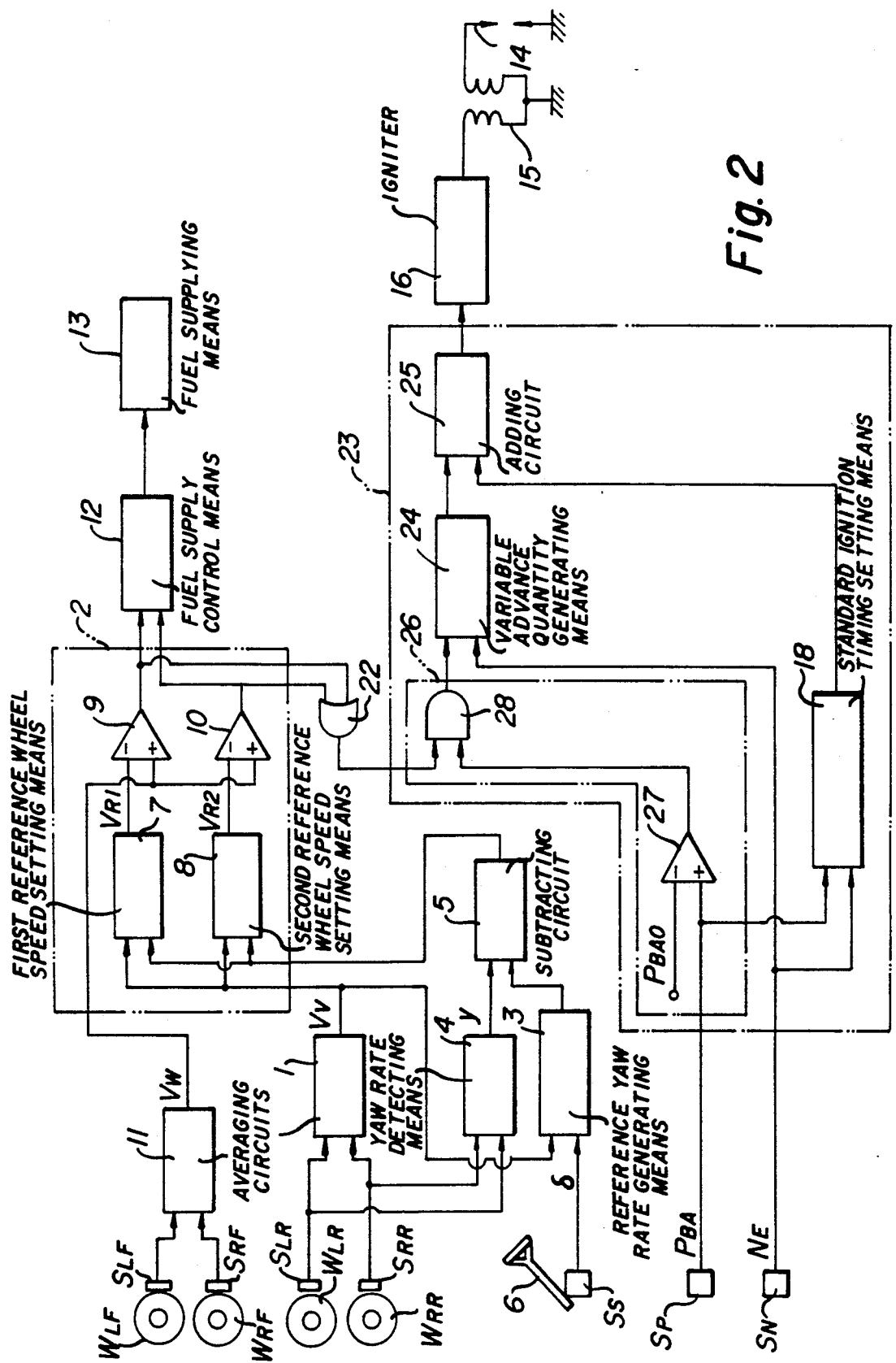
FIG. 2 is a block diagram of a second embodiment of the present invention.

Referring to FIG. 2 which shows a second preferred embodiment of the present invention wherein the same reference numerals as those in the first preferred embodiment denote the same parts, the operation of the igniter 16 is controlled by an ignition timing changing means 23. The ignition timing changing means 23 is so constructed as to advance the ignition timing of the engine from the ignition timing in a normal fuel supply condition, in synchronization with reduction of the fuel supply by the fuel supply control means 12, only when the absolute intake manifold pressure $P_{BA}$ exceeds a given value.

More specifically, the ignition timing changing means 23 includes a standard ignition timing setting means 18 for presetting a standard ignition timing according to the absolute intake manifold pressure $P_{BA}$, detected by the intake manifold pressure sensor $S_P$, and the engine speed $N_E$, detected by the engine speed sensor $S_N$, a variable advance quantity generating means 24 for presetting an advance quantity to be varied with the engine speed $N_E$, an adding circuit 25 for correcting the standard ignition timing, preset by the standard ignition timing setting means 18, by using the advance quantity preset by the variable advance quantity generating means 24, and an advance inhibiting means 26 for inhibiting advance of the ignition timing when the absolute intake manifold pressure $P_{BA}$ is not greater than a given value.

The advance inhibiting means 26 includes a comparator circuit 27 and an AND circuit 28. The intake manifold pressure sensor $S_P$ is connected to the non-inverting input terminal of the comparator circuit 27, while a signal corresponding to a reference absolute pressure $P_{BAO}$ is input to the inverting input terminal of the comparator circuit 27. An output from the comparator circuit 27 and an output from the OR circuit 22 are input to AND circuit 28. Accordingly, when the absolute intake manifold pressure $P_{BA}$ exceeds the reference absolute pressure $P_{BAO}$ and the output from the comparator circuit 27 becomes a high level, and the output from the OR circuit 22 becomes a high level in accordance with the fuel supply reduction control inclusive of the reduction of the fuel supply, the advance inhibiting means 26 generates a high-level signal. In the other cases, a low-level signal is output from the advance inhibiting means 26.

Figure 2A:
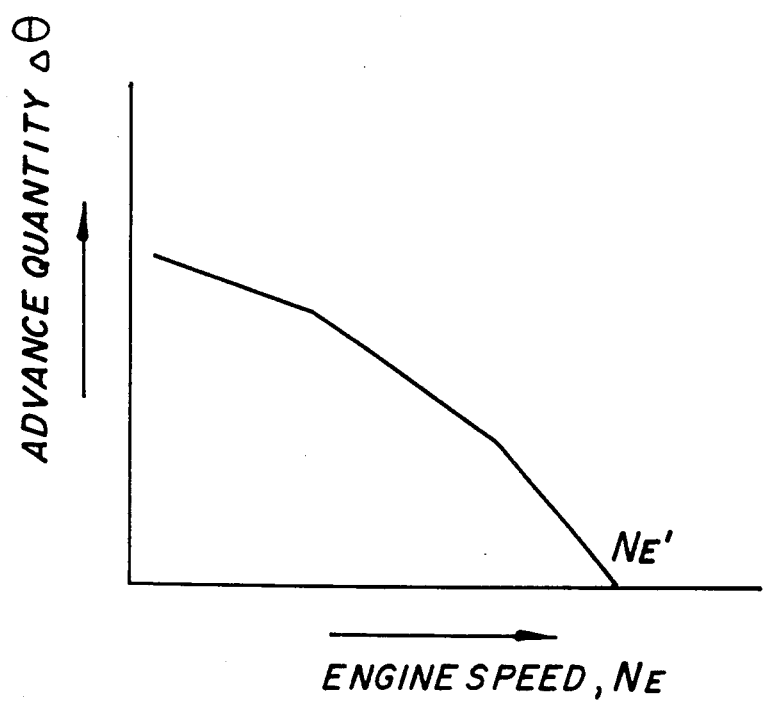
FIG. 2A is a graph showing the relationship between an advance quantity and an engine speed to be set by a variable advance quantity generating means shown in FIG. 2.

The variable advance quantity generating means 24 generates an advance quantity $\Delta\Theta$ which is present according to the engine speed $N_E$ as shown in FIG. 2A when the output from the advance inhibiting means 26 is a high level. As apparent from FIG. 2A, the larger the engine speed $N_E$, the smaller the advance quantity $\Delta\Theta$, and when the engine speed $N_E$ is not less than a given value $N_E'$, the advance quantity $\Delta\Theta$ is set to be zero. Further, when the output from the advance inhibiting means 26 is a low level, the variable advance quantity generating means 24 generates a signal indicating that the advance quantity $\Delta\Theta$ is zero.

The adding circuit 25 functions to add the advance quantity $\Delta\Theta$ generated from the variable advance quantity generating means 24 to the standard ignition timing set by the standard ignition timing setting means 18, thereby determining the ignition timing in the ignition plug 14.

In operation, when it is detected by the slip detecting means 2 that slip is about to be generated or that excess slip is presently being generated by the front wheels $W_{LF}$ and $W_{RF}$, a signal indicative of the fuel supply reduction control inclusive of the reduction of the fuel supply is output from the fuel supply control means 12. At this time, only when the absolute intake manifold pressure $P_{BA}$ exceeds the reference absolute pressure $P_{BAO}$, the ignition timing is advanced by the advance quantity $\Delta\Theta$ set by the variable advance quantity generating means 24, in synchronization with the fuel supply reduction control inclusive of the reduction of the fuel supply, and the ignition plug 14 is ignited at the advanced ignition timing.

In other words, when the absolute intake manifold pressure $P_{BA}$ is not greater than the reference absolute pressure $P_{BAO}$, the advance control of the ignition timing is inhibited irrespective of the fuel supply reduction control inclusive of the reduction of the fuel supply. This is due to the fact that the ignition timing is preliminarily advanced when the absolute intake manifold pressure $P_{BA}$ is small and the demanded voltage at the gap of the ignition plug 14 is low, thus rendering unnecessary further advance of the ignition timing.

Further, as shown in FIG. 2A, the advance quantity $\Delta\Theta$ is set to zero by the variable advance quantity generating means 24 when the engine speed $N_E$ is not less than the given value $N_{E'}$. This is due to the fact that the ignition timing is preliminarily advanced by the standard ignition timing setting means 18 when the engine speed $N_E$ is large.

Figure 3:
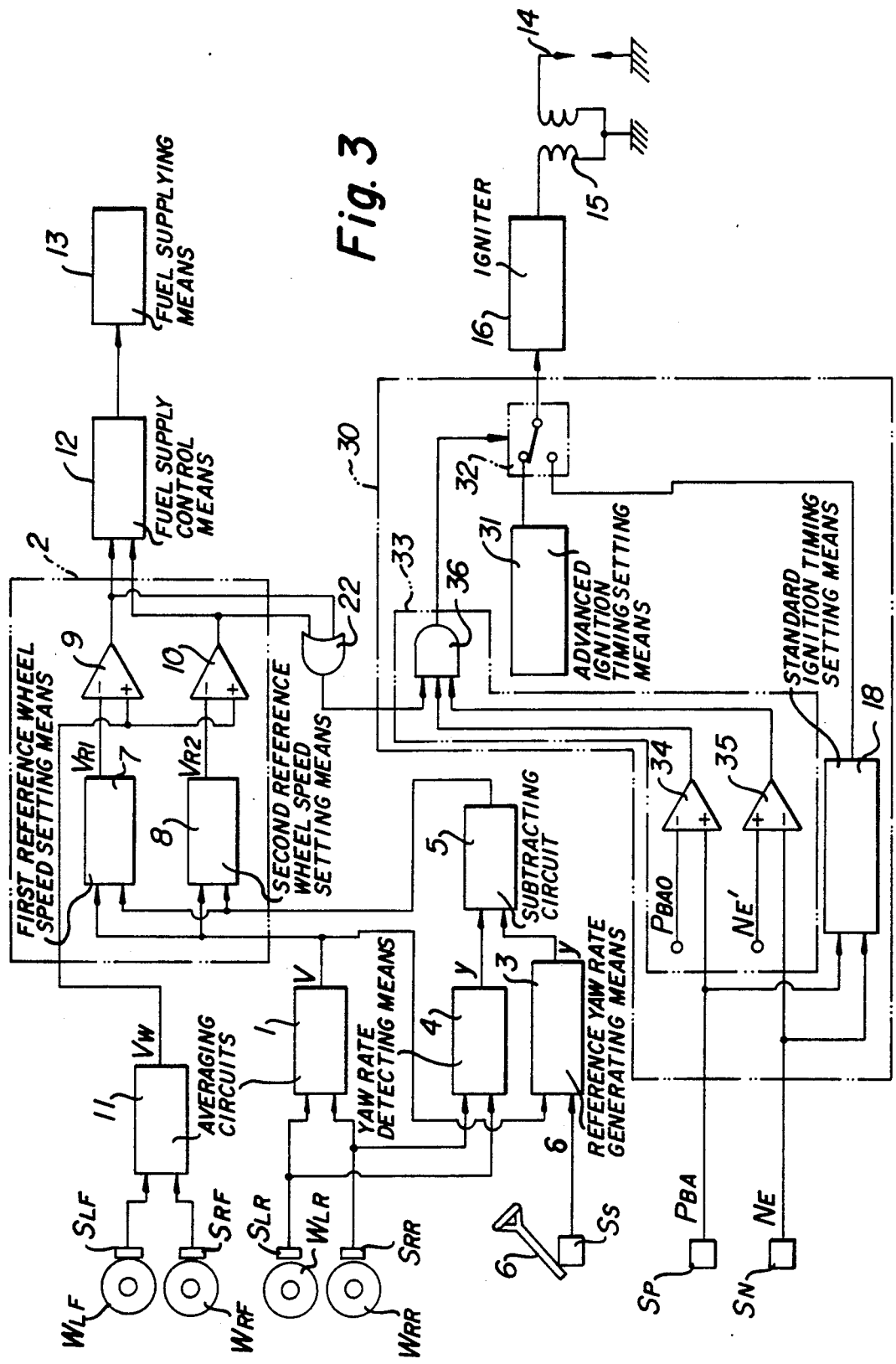
FIG. 3 is a block diagram of a third embodiment of the present invention.

Referring to FIG. 3 which shows a third preferred embodiment of the present invention wherein the same reference numerals as those in the previous preferred embodiments denote the same parts, the operation of the igniter 16 is controlled by an ignition timing changing means 30. The ignition timing changing means 30 is so constructed as to advance the ignition timing of the engine from the ignition timing in a normal fuel supply condition, in synchronization with reduction of the fuel supply only when the absolute intake manifold pressure $P_{BA}$ exceeds a given value and the engine speed $N_E$ is not greater than a given value under fuel supply reduction control inclusive of reduction of the fuel supply.

More specifically, the ignition timing changing means 30 includes a standard ignition timing setting means 18 for presetting a standard ignition timing according to the absolute intake manifold pressure $P_{BA}$, detected by the intake manifold pressure sensor $S_P$, and the engine speed $N_E$, detected by the engine speed sensor $S_N$, an advanced ignition timing setting means 31 for setting a fixed ignition timing advanced from the standard ignition timing, a switching means 32 for alternatively connecting the standard ignition timing setting means 18 or the advanced ignition timing setting means 31 to the igniter 16, and an advance inhibiting means 33 for outputting a signal for changing a switching mode of the switching means 32.

The advance inhibiting means 33 includes two comparator circuits 34 and 35 and an AND circuit 36. The intake manifold pressure sensor $S_P$ is connected to a non-inverting input terminal of the comparator circuit 34, while a signal corresponding to the reference absolute pressure $P_{BAO}$ is input to an inverting input terminal of the comparator circuit 34. On the other hand, the engine speed sensor $S_N$ is connected to an inverting input terminal of the comparator circuit 35, while a signal corresponding to the given engine speed $N_E$, is input to a non-inverting input terminal of the comparator circuit- 34 and 35 and an output from the OR circuit 22 are input to the AND circuit 36. Accordingly, when the absolute intake manifold pressure $P_{BA}$ exceeds the reference absolute pressure $P_{BAO}$ to let the output from the comparator circuit 34 become a high level, and the engine speed $N_E$ is less than the given value $N_E$ to let the output from the comparator circuit 35 become a high level, and the output from the OR circuit 22 becomes a high level under the fuel supply reduction control inclusive of the reduction of the fuel supply, the advance inhibiting means 33 generates a high-level signal. In the other cases, a low-level signal is output from the advance inhibiting means 33.

The switching means 32, functions to change a switching mode according to the output from the advance inhibiting means 33 in such a manner that when the output from the advance inhibiting means 33 is a high level, the advanced ignition timing setting means 31 is connected to the igniter 16, while when the output from the advance inhibiting means 33 is a low level, the standard ignition timing setting means 18 is connected to the igniter 16.

In operation, when a signal of fuel supply reduction control inclusive of reduction of the fuel supply is output from the fuel supply control means 12, and when the absolute intake manifold pressure $P_{BA}$ exceeds the reference absolute pressure $P_{BAO}$, and when the engine speed $N_E$ is not greater than the given value $N_E$, the ignition plug 14 is ignited at the fixed advanced ignition timing set by the advanced ignition timing setting means 31 in synchronization with the fuel supply reduction control.

The third preferred embodiment can exhibit an effect similar to that of the second preferred embodiment.

Figure 4:
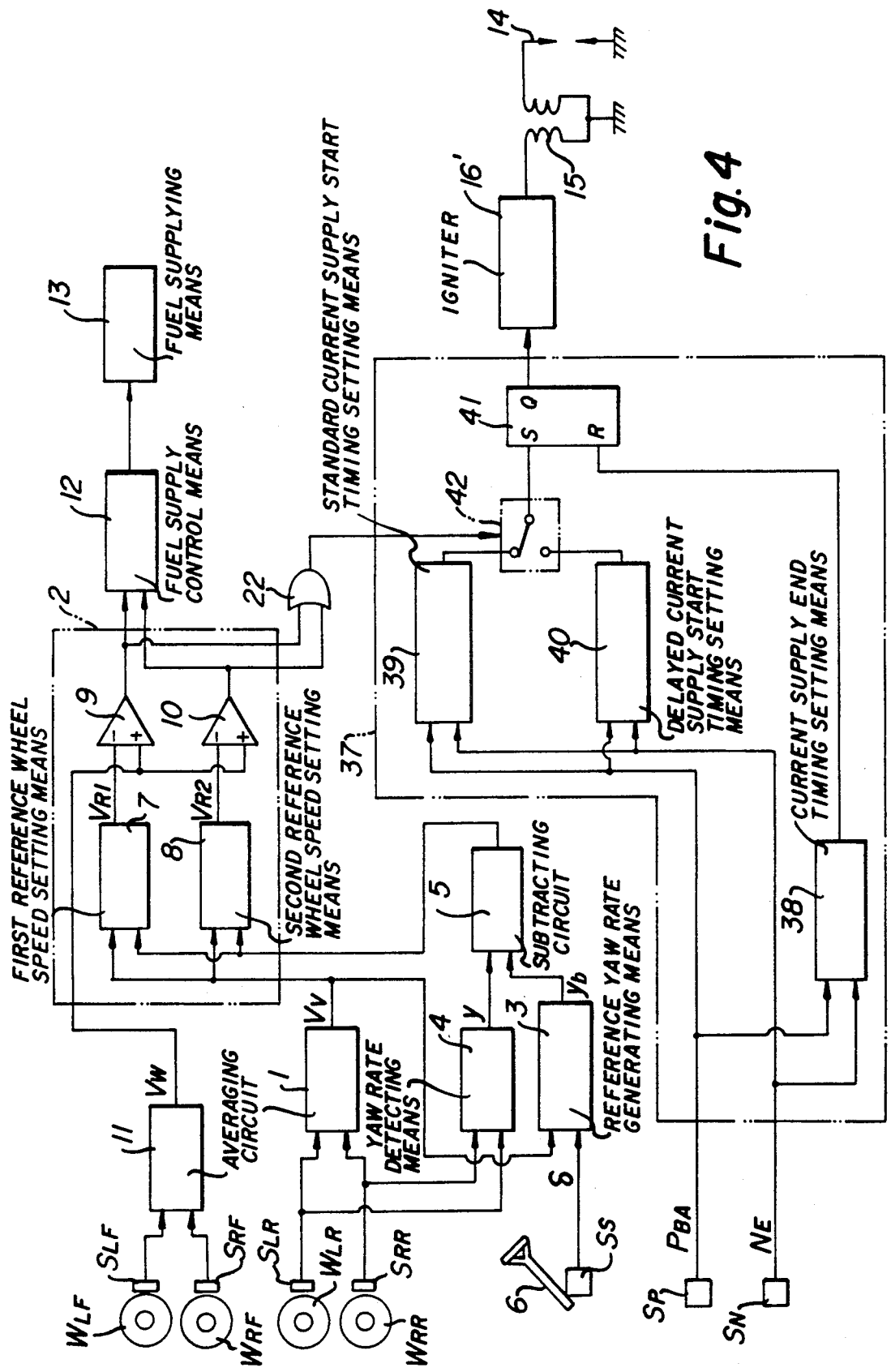
FIG. 4 is a block circuit diagram of a fourth embodiment of the present invention.

Referring to FIG. 4 which shows a fourth preferred embodiment of the present invention wherein the same reference numerals as those in the previous preferred embodiments denote the same parts, the operation of an igniter 16' connected to the ignition coil 15 is controlled by an ignition timing changing means 37. The ignition timing changing means 37 is so constructed as to shorten a period of time of current supply to the ignition plug 14 as compared with a current supply time in a normal fuel supply condition, in synchronization with fuel supply reduction control inclusive of reduction of the fuel supply to be conducted by the fuel supply control means 12.

More specifically, the ignition timing changing means 37 includes a current supply end timing setting means 38 for presetting a current supply end timing according to the absolute intake manifold pressure $P_{BA}$, detected by the intake manifold pressure sensor $S_P$, and the engine speed $N_E$, detected by the engine speed sensor $S_N$, a standard current supply start timing setting means 39 for setting a standard current supply start timing to the ignition plug 14 in the normal fuel supply control according to the absolute intake manifold $P_{BA}$ and the engine speed $N_E$, a delayed current supply start timing setting means 40 as the current supply time shortening means of the present invention for setting a delayed current supply start timing to the ignition plug 14 in the fuel supply cut control according to the absolute intake manifold pressure $P_{BA}$ and the engine speed $N_E$, a flip-flop 41 having a reset inut terminal for inputting a signal from the current supply end timing setting means 38 and a set input terminal for alternatively inputting a signal from the standard current supply start timing setting means 39 or the delayed current supply start timing setting means 40, and a switching means 42 for alternatively connecting the standard current supply start timing setting means 39 or the delayed current supply start timing setting means 40 to the set input terminal of the flip-flop 41.

An output terminal of the flip-flop 41 is connected to the igniter 16'. The switching means 42 functions to change a switching mode according to the output signal from the OR circuit 22. That is, when the output from the OR circuit 22 is a high level under the fuel supply reduction control inclusive of the reduction of the fuel supply, the switching means 42 selects a switching mode where the delayed current supply start timing setting means 40 is connected to the set input terminal of the flip-flop 41. The current supply start timing set by the delayed current supply start timing setting means 40 is delayed from that set by the standard current supply start timing setting means 39. Both the current supply start timing setting means 39 and 40 output pulses have a very short pulse width at the respective current supply start timings. Accordingly, a high-level signal continues to be output during a period of time from the timing set by either of the current supply start timing setting means 38, and the igniter 16' operates to electrically excite the ignition coil 15 according to the high-level signal.

In operation, when a fuel supply quantity is controlled to be reduced in the case that slip is about to be generated in the front wheels $W_{LF}$ and $W_{RD}$, or when fuel supply is cut off in the case that excess slip is presently being generated in the front wheels $W_{LF}$ and $W_{RF}$, the current supply time to the ignition plug 14 is shortened. Accordingly, a spark energy of the ignition plug 14 is suppressed in the above cases as compared with the normal fuel supply condition, and the spark energy of the ignition plug is reduced thereby preventing the generation of dielectric breakdown at any portions other than the gap of the ignition plug 14.

Figure 5:
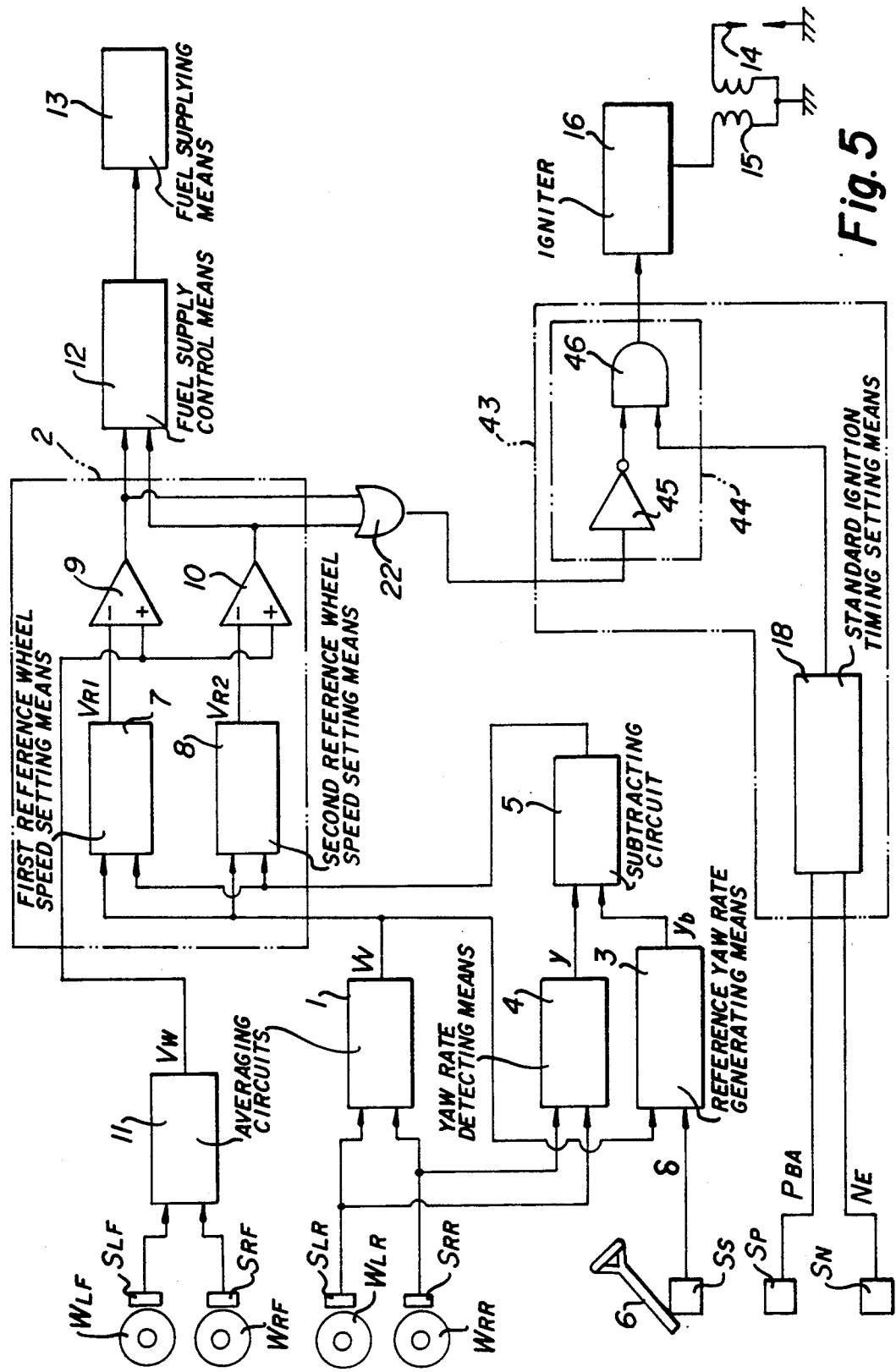
FIG. 5 is a block diagram of a fifth embodiment of the present invention.

Referring to FIG. 5 which shows a fifth preferred embodiment of the present invention wherein the same reference numerals as those in the previous preferred embodiments denote the same parts, the operation of the igniter 16 is controlled by an ignition timing changing means 43. The ignition timing changing means 43 is so constructed as to inhibit current supply to the ignition plug 14 in synchronization with the fuel supply reduction control inclusive of the reduction of the fuel supply to be conducted by the fuel supply control means 12.

More specifically, the ignition timing changing means 43 includes a standard ignition timing setting means 18 for setting an ignition timing in supplying fuel according to the absolute intake manifold pressure $P_{BA}$, detected by the intake manifold pressure sensor $S_P$, and the engine speed $NN_E$, be detected by the engine speed sensor $S_N$, and a current supply inhibiting means 44 for inhibiting current supply to the ignition coil 15 upon fuel supply cutting. The current supply inhibiting means 44 includes an inverting circuit 45 connected to the output terminal of the OR circuit 22 and an AND circuit 46 having an input terminal for inputting an output from the inverting circuit 45 and another input terminal for inputting an output from the standard ignition timing setting means 18. An output terminal of the AND circuit 46 is connected to the igniter 16.

In operation, when fuel supply is in reduction control inclusive of reduction of the fuel supply, the output from the inverting circuit 45 becomes a low level irrespective of the output from the standard ignition timing setting means 18, thereby inhibiting current supply to the ignition plug 14. Thus, the generation of dielectric breakdown at any portions other than the gap of the ignition plug 14 under the fuel supply reduction control inclusive of the reduction of the fuel supply can be prevented also by inhibiting the current supply to the ignition plug 14 because the spark energy of the ignition plug is reduced.

Although specific embodiments of the instant invention have been described above and illustrated in the accompanying drawings, the above description is made by way of example and not as a limitation to the scope of the instant invention. It is contemplated that various modifications apparent to one of ordinary skill in the art could be made without departing from the scope of the invention which is to be determined by the following claims.

We claim:

1. A driving wheel slip device for a vehicle which as an engine, comprising:
   slip detecting means for detecting a slip condition of a driving wheel;
   fuel supply means for reducing a fuel supply to an engine of the vehicle in response to an output of said slip detecting means; and
   ignition control means for reducing a spark energy of an ignition plug of the engine, in synchronization with said fuel supply control means, wherein said ignition control means comprises ignition timing changing means for changing ignition timing of the engine from a standard ignition timing under a normal fuel supply control to an advanced ignition timing, in synchronization with said fuel supply control means, said ignition timing changing means comprising:
   advanced ignition timing setting means for determining a set value of an advanced ignition timing which is advanced by a predetermined amount from said standard ignition timing, wherein an output from said advanced ignition timing setting means controls the ignition timing based upon said set value.

2. A driving wheel slip device for a vehicle which has an engine, comprising:
   slip detecting means for detecting a slip condition of a driving wheel;
   fuel supply control means for reducing a fuel supply to an engine of the vehicle in response to an output of said slip detecting means; and
   ignition control means for reducing a spark energy of an ignition plug of the engine, in synchronization with said fuel supply control mean, wherein said ignition control means comprises ignition timing changing means for changing ignition timing of the engine from a standard ignition timing under a normal fuel supply control to an advanced ignition timing, in synchronization with said fuel supply control means.

3. The driving wheel slip device of claim 2, wherein said ignition timing changing means comprises: variable advance quantity generating means for generating a variable value of the amount of ignition advance based upon an engine speed of the engine, wherein an output from said variable advance quantity generating means controls ignition timing based upon said variable value.

4. The driving wheel slip device of claim 2, wherein there is an absolute intake manifold pressure in the engine, and wherein said ignition timing changing means comprises advance inhibiting means for inhibiting operation of said ignition timing changing means when an absolute intake manifold pressure of the engine is not greater than a preset value.

5. The driving wheel slip device for a vehicle which has an engine, comprising:
   slip detecting means for detecting a slip condition of a driving wheel:
   fuel supply control means for reducing a fuel supply to an engine of the vehicle in response to an output of said slip detecting means; and
   ignition control means for reducing a spark energy of an ignition plug of the engine, in synchronization with said fuel supply control means, said ignition control means comprising:
   current supply time shortening means for shortening a period of time for supplying current to an ignition coil of the engine.

6. The driving wheel slip device for a vehicle which has an engine, comprising:
   fuel supply control means for reducing a fuel supply to an engine of the vehicle in response to an output of said slip detecting means; and
   ignition control means for reducing a spark energy of an ignition plug of the engine, in synchronization with said fuel supply control means, said ignition control means comprising:
   current supply inhibiting means for inhibiting current supply to an ignition coil of the engine.

* * * * *